United States Patent [19]

Kashio

[11] 3,832,697

[45] Aug. 27, 1974

[54] TABULATING SYSTEM

[75] Inventor: Toshio Kashio, Tokyo, Japan

[73] Assignee: Casio Computer Kabushiki Kaisha, Tokyo, Japan

[22] Filed: Oct. 4, 1973

[21] Appl. No.: 403,526

Related U.S. Application Data

[63] Continuation of Ser. No. 128,681, March 29, 1971, abandoned.

[52] U.S. Cl. .............................. 340/172.5, 197/176

[51] Int. Cl. ............................................ B41j 25/18

[58] Field of Search ............ 340/172.5; 235/61.9 R; 197/176

[56] References Cited

UNITED STATES PATENTS

| | | | |
|---|---|---|---|
| 2,918,658 | 12/1959 | Hoberg et al. | 340/174 |
| 2,941,717 | 6/1960 | Gould et al. | 235/61.9 R |
| 3,193,802 | 7/1965 | Deerfield | 340/172.5 |
| 3,240,920 | 3/1966 | Barbagallo et al. | 340/172.5 |
| 3,286,237 | 11/1966 | Kikuchi | 340/172.5 |
| 3,314,049 | 4/1967 | Felcheck | 340/172.5 |
| 3,428,793 | 2/1969 | Scuitto | 340/172.5 |
| 3,544,769 | 12/1970 | Hedin | 235/61.9 R |
| 3,613,083 | 10/1971 | De Sandre | 340/172.5 |
| 3,648,245 | 3/1972 | Dodds, Jr. et al. | 340/172.5 |
| 3,749,223 | 7/1973 | Guzak, Jr. | 197/176 |

*Primary Examiner*—Gareth D. Shaw
*Assistant Examiner*—Paul R. Woods
*Attorney, Agent, or Firm*—Shapiro and Shapiro

[57] ABSTRACT

A tabulating unit is provided with a tabulating register for storing a predetermined tabulating information and a control unit which reads out the tabulating information and in response to the tabulating information, generates counting pulses so that information stored in an operation register may be automatically tabulated in accordance with the counting pulses, that is the preset number of digits may be printed out in each column of an account or the like.

5 Claims, 10 Drawing Figures

| | 10 (MSD) | 9 | 8 | 7 | 6 | 5 | 4 | 3 | 2 | 1 (LSD) |
|---|---|---|---|---|---|---|---|---|---|---|
| (a) | 0 | 0 | 0 | 0 | 0 | 0 | 0 | 3 | 3 | 5 |
| (b) | 0 | 0 | 0 | 0 | 0 | 0 | 0 | 1 | 2 | 3 |
| (c) | 0 | 0 | 0 | 0 | 0 | 0 | 0 | 4 | 5 | 6 |
| (d) | 0 | 0 | 0 | 0 | 0 | 5 | 6 | 0 | 8 | 8 |

| | 10 (MSD) | 9 | 8 | 7 | 6 | 5 | 4 | 3 | 2 | 1 (LSD) |
|---|---|---|---|---|---|---|---|---|---|---|
| (a) | 15 | 0 | 0 | 0 | 0 | 0 | 0 | 3 | 3 | 5 |
| (b) | 3 | 3 | 5 | 15 | 0 | 0 | 0 | 0 | 0 | 0 |
| (c) | 3 | 5 | 15 | 0 | 0 | 0 | 0 | 0 | 0 | 3 |
| (d) | 5 | 15 | 0 | 0 | 0 | 0 | 0 | 0 | 3 | 3 |
| (e) | 15 | 0 | 0 | 0 | 0 | 0 | 0 | 3 | 3 | 5 |

| DECIMAL NUMBER | A | B |
|---|---|---|
| 1 | $\bar{8}\,\bar{4}\,\bar{2}\,1$ | $\bar{8}\,\bar{4}\,\bar{2}$ |
| 2 | $\bar{8}\,\bar{4}\,2\,\bar{1}$ | $\bar{8}\,\bar{4}\,\bar{1}$ |
| 3 | $\bar{8}\,\bar{4}\,2\,1$ | $\bar{4}\,2\,1$ |
| 4 | $\bar{8}\,4\,\bar{2}\,\bar{1}$ | $4\,\bar{2}\,\bar{1}$ |
| 5 | $\bar{8}\,4\,\bar{2}\,1$ | $4\,\bar{2}\,1$ |
| 6 | $\bar{8}\,4\,2\,\bar{1}$ | $4\,2\,\bar{1}$ |
| 7 | $\bar{8}\,4\,2\,1$ | $4\,2\,1$ |
| 8 | $8\,\bar{4}\,\bar{2}\,\bar{1}$ | $8\,\bar{2}\,\bar{1}$ |
| 9 | $8\,\bar{4}\,\bar{2}\,1$ | $8\,\bar{2}\,1$ |
| 10 | $8\,\bar{4}\,2\,\bar{1}$ | $8\,2\,\bar{1}$ |

TABULATING SYSTEM

This is a continuation application of Ser. No. 128,681, filed Mar. 29, 1971, now abandoned.

BACKGROUND OF THE INVENTION

The present invention relates to generally a tabulating system and more particuraly a tabulating system for calculators having a recording device.

Some kinds of the recording calculators have a tabulator for determining the so-called tabulating positions to provide columnar copies and a space. In the calculators of the type described, it is generally required to control the number of digits to be sequentially read out or outputed from a register with a predetermined digit capacity for storing the information to be printed so that the predetermined number of digits may be printed or typed in each column. In the prior art the number of digits to be printed in one column is generally programmed on a program tape or card so that the number of programming steps is increased, thus resulting in a complicated programming. Especially in the recording calculator in combination with the tabulator (to be referred to as "tabulating unit" hereinafter), the designation of the number of digits to be typed out by a program card or tape is incompatible with the simplification of programming.

Furthermore in the prior art tabulating unit the tabulation is set manually. For example in the conventional typewriter of the type in which a platen is displaced by a space corresponding to one character whenever a typebar hits the platen, the platten is displaced by manual operation or by a space bar so as to lock the tabulation or selected tabulating positions. This is very troublesome operation.

SUMMARY OF THE INVENTION

The primary object of the present invention is to simplify the operation for setting the number of digits to be typed out in one column in a tabulating unit.

Another object of the present invention is to provide a novel tabulating system for recording caluculators in which the number of digits to be typed out in respective columns may be set in one simple operation so that the information stored in a register may be tabulated.

Another object of the present invention is to provide a novel tabulating system for automatically setting the tabulation by electronic means without manually displacing the printing mechanism or platen.

The novel tabulating system in accordance with the present invention may be advantageously applied to the conventional typewriter of the type described above, a mechanical recording device of the type having a writing head consisting of one printing element capable of moving to various positions to print or type out characters or indicia such as a ball printer in which one printing ball having various types formed upon the peripheral surface thereof rotates and hits the platen to print, and an electronic type recording device such as an ink jet printer of the type having a writing head including one or a plurality of nozzles for ejecting ink under the control of the electrostatic force, electromagnetic force or ultrasonic waves to print letters.

According to one aspect of the present invention, there is provided a register for storing the number of digits to be sequentially typed out in one columm. The number of digits to be sequentially typed out in one column may be entered by depression of an entry button or by a programmed card or tape.

According to another apsect of the present invention, a platen may be automatically shifted to a selected tabulating position and a tabulation lock may be accomplished in a simple manner in accordance with a content in a tabulating register.

DESCRIPTION OF THE PREFERRED EMBODIMENT

Figure 1:
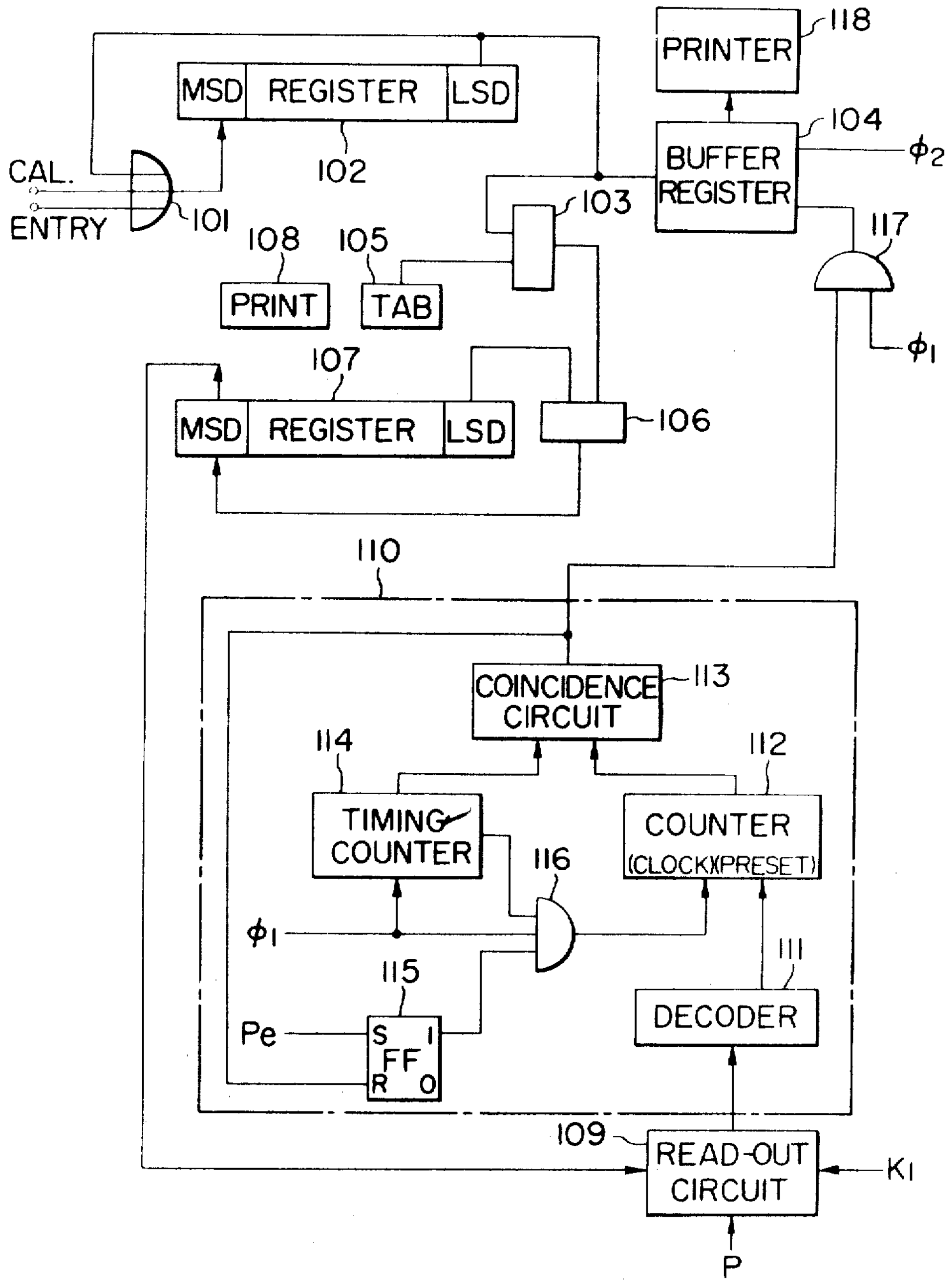
FIG. 1 is a block diagram of the preferred embodiment of a tabulating system in accordance with the present invention.

Referring to FIG. 1, input information is applied to an input terminal ENTRY of an OR gate 101 upon depression of an entry button of a key board and information representative of the results of calculation or arithematic operation or other information to be stored is applied to an input terminal CAL. The input terminals ENTRY and CAL are connected through the OR gate 101 to the most significant digit MSD of a register 102 for storing the information of caliculation or the like, which is called an operating register. The operating register is for example a recirculating type two-phase dynamic register having for example a capacity of 10 digits each digit comprising four bits. Writing and readout are accomplished in response to clock pulses $\phi 1$ and $\phi 2$ shown in FIGS. 2(*a*) and 2(*b*) and preferably cut of phase by 180°. The output terminal from the least significant digit LSD of the register 102 forms the reentrant configuration by connecting to the register stage MSD through the OR gate 101. The output of the register 102 is applied to the input terminal of a gate 103 and to the input terminal of a buffer register 104. The gate 103 comprises four AND gates for read out in parallel of one-digit information from the operating register 102, but is illustrated by one block in FIG. 1. The other input terminal of the gate 103 is connected to a tabulation key 105.

The output terminal of the gate 103 is connected to the input terminal of the most significant digit MSD of a tabulating position memory register 107 through an OR gate 106. The tabulating position memory register 107 is also called a tabulating register, which is similar in construction to the operating register 102 and has a capacity of 10 digits. It is also a recirculating type two-phase dynamic register. The least significant digit LDS of the tabulating register 107 is connected to the most significant digit MSD thereof through the OR gate 106. The output terminal of the register stage MSD is connected to one input terminal of a readout circuit 109. To a second input terminal of the readout circuit 109 is applied the digit pulse $K_1$ shown in FIG. 2(*c*) and to the third input terminal P is applied a pulse signal which rises to "1" level only during one frame of the digit pulses $K_1 - K_{10}$ from the time of print button 108 is depressed so as to generate the print instruction. The read-out circuit 109 comprises four AND gates and four inverters for reading out in parallel the information from the register stage MSD of the tabulating register 107. The output terminal of the readout circuit 109 is connected to the input terminal of a decoder 111 in an output terminal control unit 110 which is arranged in accordance with the truth table shown in FIG. 9, which will be described in more detail hereinafter. The output terminal of the decoder 111 is connected to the input terminal (PRESET) of a counter 112. It is noted that the number of output terminals of the decoder is ten because the tabulating register 107 is assumed to have the 10-digit capacity. To the other input terminal of the counter 112 is applied the clock pulse as will be described in more detail hereinafter.

Figure 2:
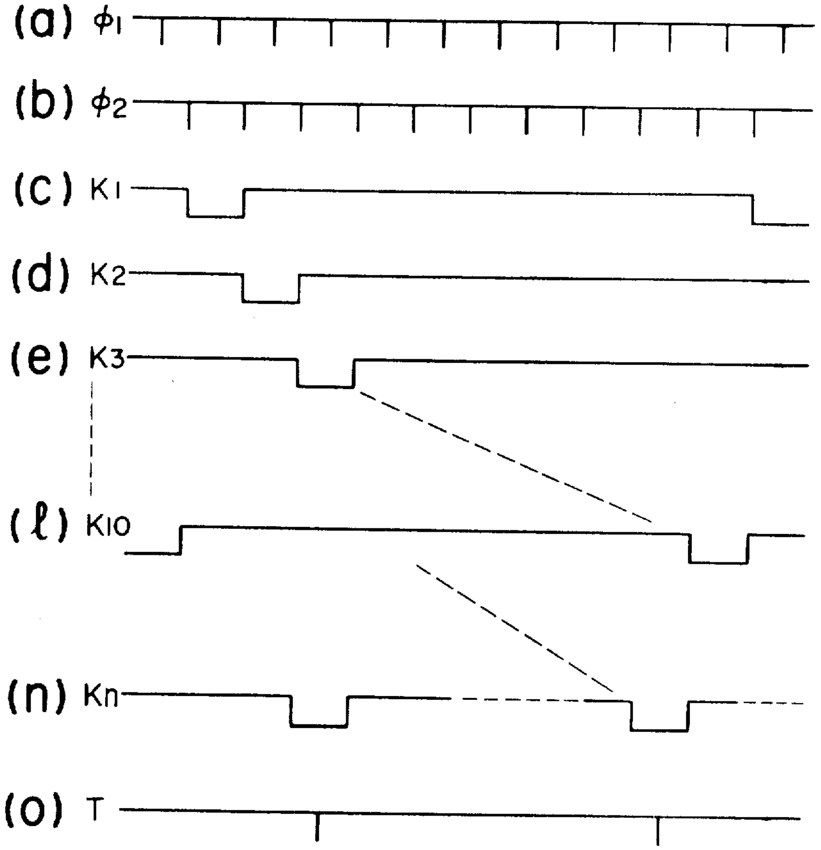
FIG. 2 is a timing chart for explanation of the mode of operation of the embodiment shown in FIG. 1.

The output terminal of the counter 112 is connected to one input terminal of a coincidence circuit 113. To another input terminal of the coincidence circuit 113 is applied the signal from one of 10 digit output terminals of a timing or ring counter 114 which may output the respective 10 digit pulses as shown in FIGS. 2(*c*), (*d*), (*e*) . . . . . . . (*l*).

The output terminal of the coincidence circuit 113 is connected to a reset input terminal of a flip-flop 115 to the set terminal of which is applied the print-end signal Pe which is generated everytime when a numeral character or result of calculation is printed out. The output terminal of the flip-flop 115 is connected to a first input terminal of an AND gate 116 which has three input terminals and an output generating clock pulses for driving the counter 112. A second input terminal of the AND gate 116 is connected to a terminal from which is applied a clock pulse $\phi 1$ for driving the timing counter 114 and a third input terminal is connected to a terminal which outputs the signal from the least significant digit of the timing counter 114 which circulates n digit pulses (in the instant embodiment 10 digit pulses) to control the timing in printing each digit. The digit pulse is for example as digit pulse kn shown in FIG. 2(*n*). The output terminal of the AND gate 116 is connected to the clock pulse terminals of the counter 112. In response to the content read out from the tabulating register 107, the counter 112 is preset and the content of the counter 112 is compared with the output from the timing counter 114 by the coincidence circuit 113.

The output terminal of the control unit 110, that is the output terminal of the coincidence circuit 113 is connected to one input terminal of an AND gate 117 which is actuated in response to the write clock pulse $\phi 1$ as shown in FIG. 2(*a*), and the output of the AND gate 117 is applied to the buffer register 104, which may be a two-phase dynamic register having one-digit capacity with one digit consisting of four bits. The content of the operating register 102 is written during the phase $\phi 1$ and the content of the buffer register 104 is read out during the phase $\phi 2$. The output of the buffer register is applied to a printer 118 for printing. The write clock pulse $\phi 1$ and readout clock pulse $\phi 2$ shown in FIGS. 2(*a*) and 2(*b*) are applied to the operating register 102, the buffer register 104 and the tabulating register 107, though they are not shown in FIG. 1 for clarity.

Figure 3:
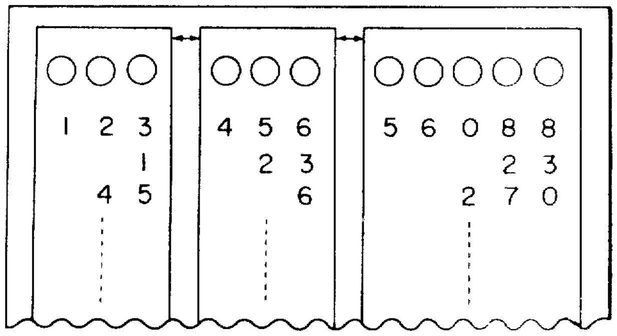
FIG. 3 is a fragmentary view illustrating an account or the like upon which information is tabulated in accordance with the present invention.

Next the mode of operation will be described in detail, and it is assumed that an account or the like as shown in FIG. 3 is prepared and that it is desired to set the tabulating positions between the fifth and sixth digits and between the eighth and ninth digits and at the fourteenth digit position. In other words, five digits are typed out in the right column; three digits in the middle column and three digits in the left column, so that one enters 3 3 5 into the tabulating register as will be described hereinafter in more detail. The margins establishing method and the ineffective zero erasing method will not be described in this specification as they are not necessary to understand the present invention. The contents of the registers shown in FIGS. 4 and 5 are those at time $K_1$ shown in FIG. 2(*c*).

Figures 4, 5, 7, 9:
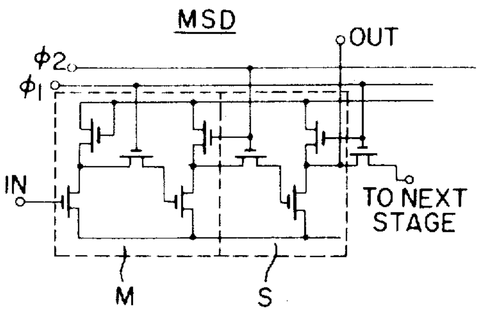
FIG. 4 is an explanatory view illustrating the shifts of the content in an operating register shown in FIG. 1.
FIG. 5 is an explanatory view illustrating the shifts of the content in a tabulating register shown in FIG. 1.
FIG. 7 is a circuit diagram of one bit cell when the register shown in FIG. 6 is fabricated into an integrated circuit.
FIG. 9 shows a truth table based upon which a decoder shown in FIG. 8A is constructed.

First by the entry button in the key board (not shown), the numerical numbers 3 3 5 are entered into the operating register 102 through the ENTRY terminal and OR gate 101 as shown in FIG. 4(*a*). From the output terminal of the register state LSD of the operating register 102, the least significant digit or first digit is read out in response to the timing pulse $K_1$ shown in FIG. 2(*c*); the next least significant digit or the second digit is read out in response to the timing pulse $K_2$ shown in FIG. 2(*d*); and the third digit is read out in response to the timing pulse $K_3$ shown in FIG. 2(*e*) and so on. That is in response to the timing signal $K_{10}$, the most significant digit or the tenth digit is read out. These read out digits are circulated through the OR gate 101 and are held in the register 102.

Next upon depression of tabulation key 105, the gate 103 is opened in response to the timing or digit pulses $K_1 - K_{10}$ so that the content of the operating register 102 shown in FIG. 4(*a*) is completely transferred into the tabulating register 107 as shown in FIG. 5(*a*). In this case it is assumed that a control mark "15" to be described hereinafter is automatically entered into the register stage MSD. (Since one digit comprises four bits so that in addition to the decimal digits 0–9, 10–15 may be also represented). The numerical number may be entered in the tabulating register as in the case of the operating register and the recirculating loop may be held through the OR gate 106.

When the control mark 15 in the most significant digit register stage MSD in the tabulating register 107 into which are now held the tabulating positions is read out, the content in the register 107 is shifted as shown in FIG. 5(*b*) and the third digit "3" is outputed in response to the digit or timing pulse $K_1$ shown in FIG. 2(*c*) from the output terminal of the register stage MSD of the tabulating register 107 and then is recirculated.

If it is desired to tabulate mechanically, a printing element or platen is automatically shifted by three-digit space in response to the depression of the print button 108. Thereafter the tabulation lock is accomplished at the selected tabulating position. In the similar manner tabulation lock may be accomplished in a simple manner depending upon the number of digits 3, 3 and 5 in one column. The number of digits to be printed out of the content of the operating register is set as described above independently of whether the tabulation lock is accomplished or not.

Upon completion of setting the number of digits to be printed out in one column, the numerical numbers 1 2 3 are entered as shown in FIG. 4(*b*) in the operating register 102 and upon depression of the print button 108, the print instruction is applied to the input terminal P of the readout circuit 109, which is opened in response to the digit pulse $K_1$ so that the counter 112 in the control unit 110 may be set through the decoder 111 depending upon the information (representative of the selected tab-positions) from the tabulating register 107. More particularly in the instant embodiment the counter 112 is so set that the output signal is derived from the output terminal of the control unit 110, that is the output terminal of the coincidence circuit 113 in response to the digit pulse $K_3$ from the timing counter 114. The output is strobed by the clock pulse $\phi 1$ used as the write clock to be applied to the buffer register 104. Therefore, only the content corresponding to the digit pulse $K_3$, that is the third digit "1" in the operating register 102 enters the buffer register 104 and is read out in response to the pulse $\phi 2$ to be applied to the printer 118. In this case, a write head (not shown) is displaced by a pulse motor or the like upon a recording medium in response to the output applied to the printer 118. In the control unit 110, in response to the output pulse outputted in response to the timing pulse $K_3$, the flip-flop 115 is reset. When the third digit 1 in the operating register 102 has been printed, the print-end signal enters the set terminal of the flip-flop 115 to thereby set it. That is, the signal 1 is derived from the flip-flop 115 and is kept applied to the first input terminal of the AND gate 116. When the output from the timing counter 114 and the clock pulse $\phi 1$ are simultaneously applied to the AND gate 116, the AND output T as shown in FIG. 2(*o*) is derived and applied to the counter 112 so that the content in the counter 112 is reduced by one. Therefore, the control unit 110 is so set that it outputs the output pulse in response to the digit or timing pulse $K_2$. As a consequence in response to the timing pulse $K_2$, the second digit "2" in the operating register is entered into the buffer register 104, which in turn outputs the printing information of 2 to the printer 118. In the similar manner, the control unit is so set as to output the output pulse in response to the timing pulse $K_1$. As a consequence the first digit 3 in the operating register 102 is transferred into the buffer register 104, which in turn outputs the printing information to the printer 118 in response to the clock pulse $\phi 2$. Thus the printing of the numerical numbers 1, 2 and 3 is accomplished. In this case in response to the all-printed signal (not shown), the content of the tabulating register 107 is shifted to the left as shown in FIG. 5(*c*) so that in response to the timing pulse $K_1$ the content in the next most significant digit stage, that is 3 is outputed.

Next the numerical numbers 4, 5 and 6 are entered into the operating register 102 as shown in FIG. 4(*c*) and the print button 108 is depressed so as to apply the print instruction to the print instruction input terminal P of the readout circuit 109. Then, in the similar manner as described above the content of the operating register 102, that is, 4, 5 and 6 are sequentially printed. Upon completion of printing "6" the content of the tabulating register 107 is shifted to the left as shown in FIG. 5(*d*) in response to the all-print-end signal. Then in the similar manner described above, the number of digits or "5" is set and the numerical numbers 5, 6, 0, 8 and 8 entered in the operating register 102 as shown in FIG. 4(*d*) are printed. Upon completion of printing of 5, 6, 0, 8 and 8 the content of the tabulating register 107 is shifted to the left as shown in FIG. 5(*e*). The control mark 15 is now in the most significant digit stage and is read out so that the tabulating register 107 is shifted again until 3 is stored in the most significant digit stage as shown in FIG. 5(*b*). The content of the tabulating register 107 is recirculated as numbers entered in the operating register 102 are tabulated in the similar manner as described above.

It is noted that the control mark may be used as a signal for returning the carriage.

Figure 6:
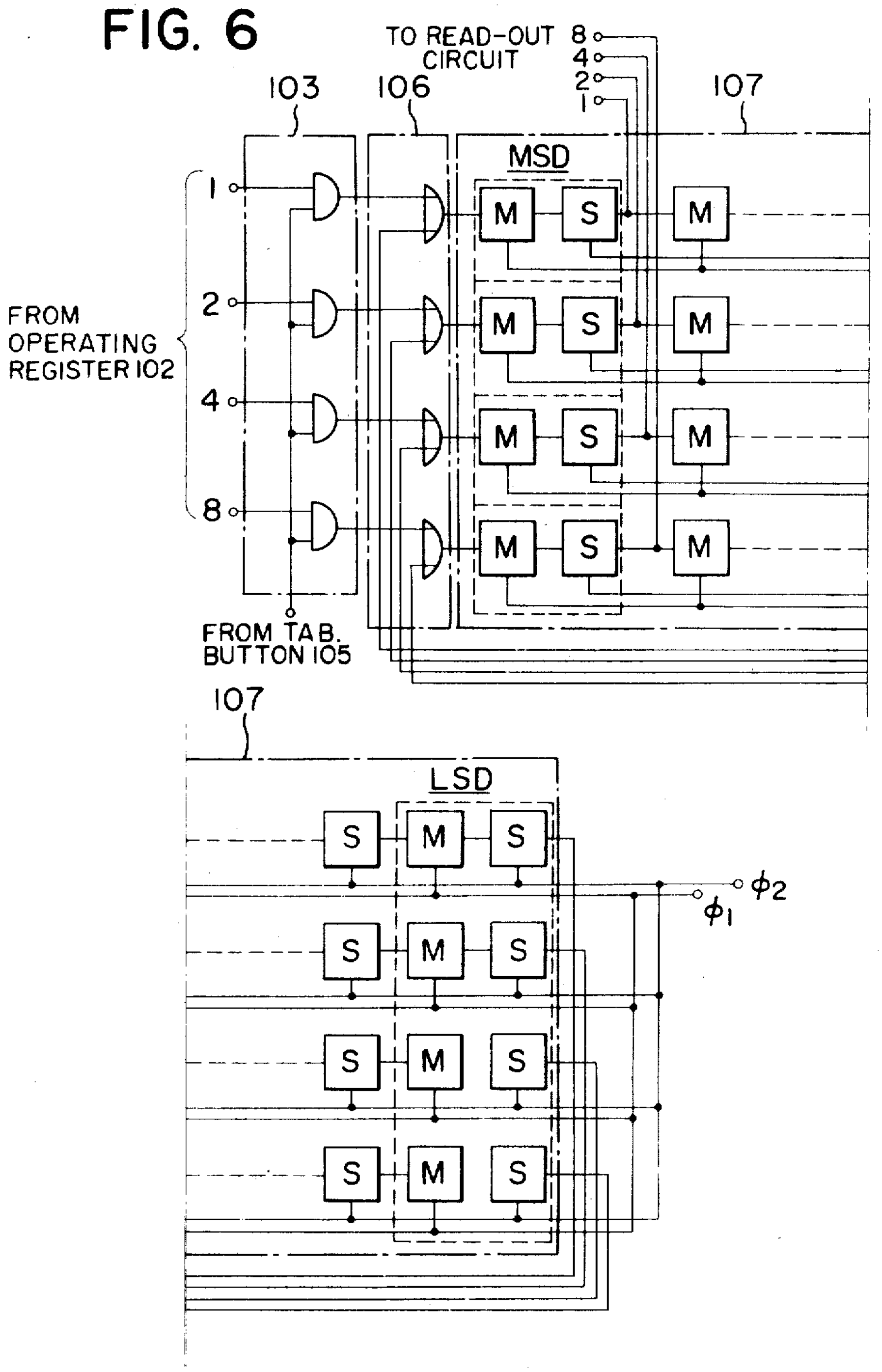
FIG. 6 is a circuit diagram of the tabulating register.

FIG. 6 shows a block diagram of one embodiment of the tabulating register 107 shown in FIG. 1. As described previously the tabulating register is a parallel recirculating type two-phase dynamic register with a 10-digit capacity, each digit consisting of four bits. The tabulating register 107 comprises a plurality of pairs of flip-flop circuits each capable of storing one bit. A master flip-flop M stores the input information in response to the write clock pulse $\phi 1$ and a slave flip-flop S serves to transfer the stored information into the next stage in response to the read-out clock pulse $\phi 2$. The information in the least significant digit stage LSD is reentered into the most significant digit stage MSD. The most and least significant digit stages have the input and output circuits respectively.

More particularly, the operating register 102 is connected to the master flip-flop M in the most significant digit stage MSD of the tabulating register 107 through a gate circuit 103 consisting of four AND gates and a OR gate 106 consisting of four OR gates and four weighted wires. The output is derived in parallel from the slave flip-flop S. The tabulating register 107 includes 10 stages connected in series, each stage consisting of four bits. The write clock pulse $\phi 1$ is applied to each of the master flip-flop M and the readout clock pulse $\phi 2$ to the slave flip-flop S.

FIG. 7 is a circuit diagram of an integrated circuit of one flip-flop of the tabulating register 107 shown in FIG. 6. The flip-flop consists of a master M and a slave S each of which consists of three MOS field effect transistors of the type in which the charge corresponding to the information pulse is stored by the stray capacity between the gate electrode and the substrate for temporarily holding the information.

Figure 8A:
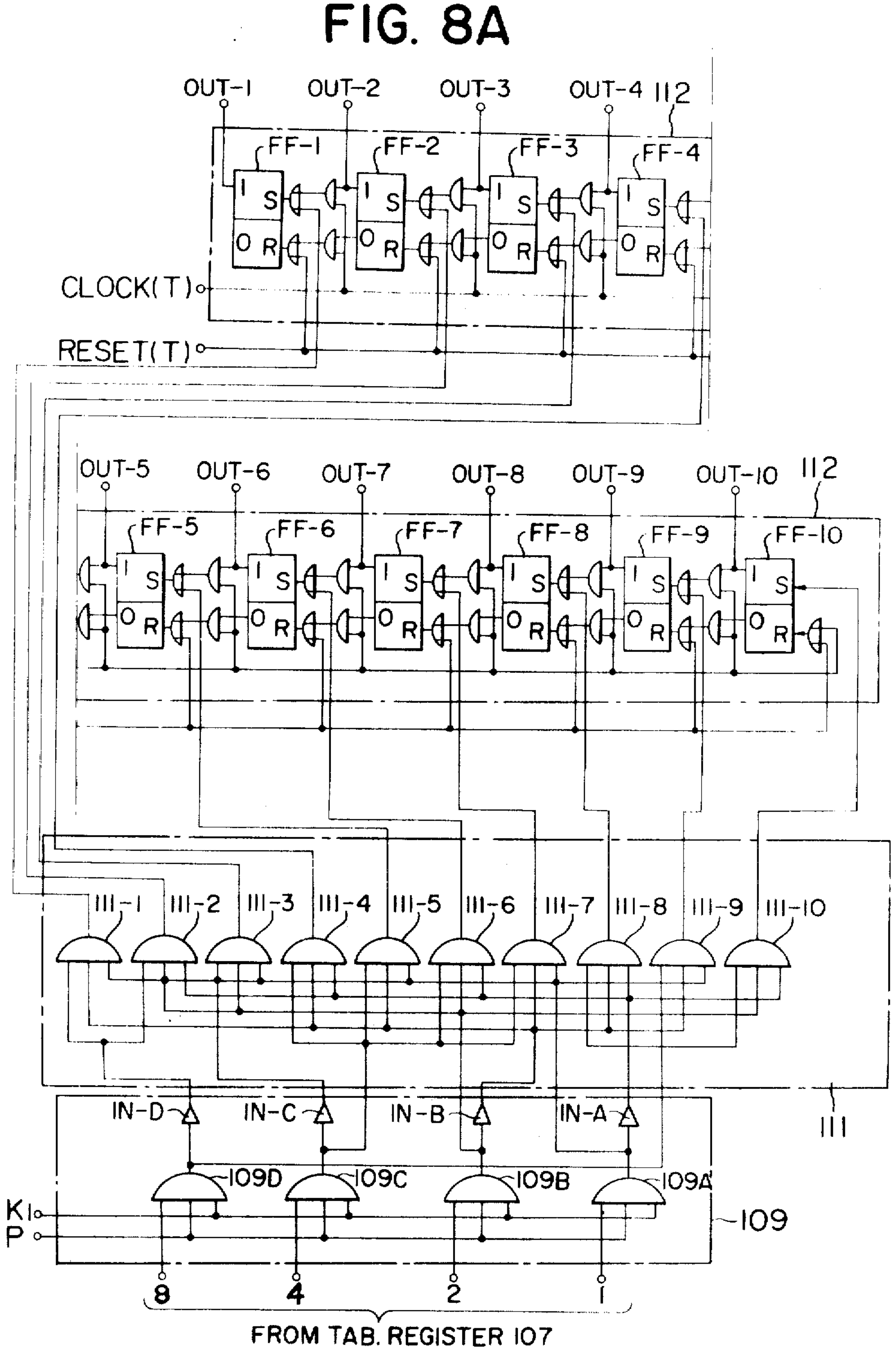
FIGS. 8A and 8B are detailed circuit diagrams of a control circuit shown in FIG. 1.
Figure 8B:
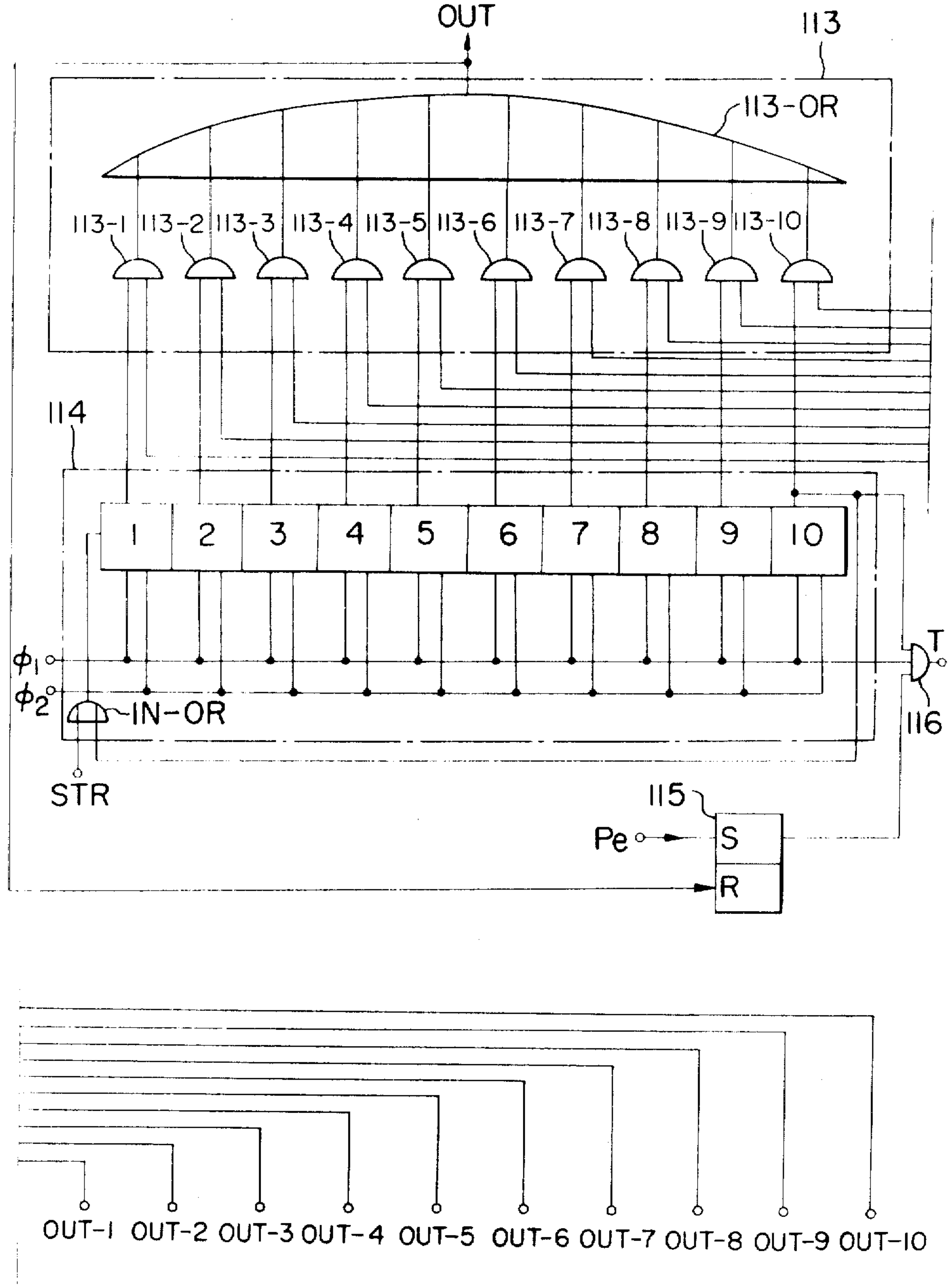

FIGS. 8A and 8B show the circuit diagrams of the control unit 110 shown in FIG. 1. A coded information is written into the decoder 111 through the readout circuit 109 consisting of four AND gates 109A-109D and four inverters from IN-A to IN-D and is decoded by the decoder 111 which consists of ten AND gates from 111-1 to 111-10.

The construction and mode of operation of the decoder 111 may be explained based upon the truth table shon in FIG. 9. The decimal digits from 1-10 are shown in the left column A in the truth table by the 1, 2, 4, 8 code. The 1, 2, 4, 8 code shown in the left column A of the truth table may be simplified as shown in the right column B because only one signal is derived from the output terminal of the decoder 111 in response to the 1, 2, 4, 8 code shown in the left column A in the truth table in FIG. 9 and applied to the decoder 111. The decoder 111 shown in FIG. 8A is constructed based upon the code shown in the right column of the truth table shown in FIG. 9.

Referring back to FIG. 8A, the output terminals of the respective stages of the decoder 111 are connected to the set signal input terminals of the counter 112 which consists of 10 flip-flop stages from FF-1 to FF-10 and their associated gates. As is obvious to those skilled in the art, the counter 112 shown in FIG. 8A is a down counter, but it is understood that the counter 112 may be constructed by a combination of an up counter with a complement circuit.

The output terminals from OUT-1 to OUT-10 of the counter 112 are connected to the respective input terminals of the coincidence circuit 113. The respective reset input signal terminals R of the flip-flop from FF-1 to FF-10 are connected to the RESET input terminal to which is applied the print-end signal upon completion of the printing so as to clear all of the content in the counter 112.

FIG. 8B shows the timing counter 114 and the coincidence circuit 113 in the control unit 110. The timing counter 114 has an input terminal STR to apply the pulse through an IN-OR gate for activating the timing counter 114. The counter 114 is a circulation type two-phase dynamic counter and is operated during the phases $\phi 1$ and $\phi 2$. More particularly in response to the clock pulses $\phi 1$ and $\phi 2$, the timing pulses $K_1$ to $K_{10}$ are sequentially generated from the output terminals of the first to the last stages as shown in FIGS. 2(*c*) to 2(*l*).

The outputs from the timing counter 114 are applied to the input terminals of AND gates 113-1 to 113-10 of the coincidence circuit 113 together with the outputs from OUT-1 to OUT-10 from the counter 112. The outputs of the AND gates 113-1 to 113-10 are applied to an OR gate 113.

Next the mode of operation will be described with reference to FIGS. 8A, 8B and 9. It is assumed that the numerical numbers 1, 2 and 3 are entered in the operating register 102. Upon depression of the print button 108, the readout circuit 109 is opened in response to the print instruction signal and the timing pulse $K_1$ so that the word 3 is transferred in parallel from the stage MSD of the tabulating register 107 into the decoder 111 in the control unit 110. As a consequence the output is derived from the AND gate 111-3 so that the flip-flop FF-3 in the counter 112 is set and the SET output of the flip-flop FF-3 is derived from an output terminal OUT-3.

In response to the digit or timing pulse $K_3$ from the timing counter 114, the AND gate 113-3 is opened and the output of the control unit 110 is derived through the OR gate 113-OR, and the flip-flop 115 is reset. As a consequence the content in the third digit stage in the operating register 102 is printed out and upon completion of printing the print-end signal Pe is generated and applied to the flip-flop 115 thereby setting it. When the AND gate 116 supplies the counter 112 with the clock pulse shown in FIG. 2(*o*) and generated in response to the coincidence of the timing or digit pulse $K_{10}$ from the timing counter with the clock pulse $\phi 1$, only FF-2 in the counter 112 outputs the SET output. This means that the counter 112 counts down by one so that the control unit 110 outputs in response to the digit or timing pulse $K_2$. The operation of the control unit 110 is repeated in the manner described above, and the counter 112 counts down by one so that only FF-1 outputs the SET output. As a consequence the control unit 110 outputs in response to the timing or digit pulse $K_1$. All-print-end signal is applied through the RESET terminal to the respective input terminals of the flip-flop in the counter 112 upon completion of printing out of the content in the first stage or digit in the operating register 102, whereby all of the flip-flop in the counter 112 are reset.

Next in response to the timing or digit pulse $K_1$ the control unit 110 applies the next information to the decoder 111 from the tabulating register 107 through the readout circuit 109 and the similar operation is cycled.

In the instant embodiment, the operating and tabulating registers 102 and 107 have been described as being the parallel recirculating type dynamic registers, but it is understood that the series recirculating type dynamic registers and other types of registers may be employed. It is also understood that other types of flip-flop may be employed. Furthermore, the counter in the control unit has been described as being a shift register and the timing counter, as being a two-phase dynamic counter may be employed.

What is claimed is:

1. A tabulating system for a printer, said system comprising:

a tabulating register;

means connected to said tabulating register for entering into said tabulating register a sequence of digits which correspond, respectively, to the widths in character positions of a plurality of columns to be provided on a recording medium;

presettable counter means;

read-out means connected to said tabulating register and to said counter means for presetting said counter means to a count number corresponding to one of the digits entered in said tabulating register;

an operating register;

input means connected to said operating register for entering into said operating register data to be printed in each column of the recording medium;

timing counter means for generating timing signals corresponding to data positions of the operating register;

a coincidence circuit connected to said presettable counter means and to said timing counter means for producing a coincidence signal when the timing signal from said timing counter means corresponds to the count number in said presettable counter means;

control means connected to said coincidence circuit and to said operating register for causing a printer to print a character corresponding to data at a data position of said operating register according to the count number of the presettable counter means;

means for stepping the count number in said presettable counter means each time said control means causes the printer to print a character; and means for causing said read-out means to preset said presettable counter means to a count number corresponding to another of the digits entered in said tabulating register when the presettable counter means has been stepped to a predetermined count.

2. A tabulating system according to claim 1, wherein said operating register has means for shifting the data entered therein and wherein said timing counter means generates timing signal pulses in synchronism with the shifting operation of said operating register, each timing pulse indicating the data position, counted from the least significant position, of said operating register.

3. A tabulating system according to claim 1, wherein said control means comprises a buffer register connected to said operating register and to said coincidence circuit for temporarily storing data to be printed in response to said coincidence signal.

4. A tabulating system according to claim 1, wherein said tabulating register has means for shifting the digits entered therein so as to present different digits to said read-out means.

5. A tabulating system according to claim 1, wherein said means for entering said digits into said tabulating register includes said operating register.

* * * * *